Patented Sept. 24, 1929

1,728,995

UNITED STATES PATENT OFFICE

RICHARD HERZ AND FRITZ SCHULTE, OF FRANKFORT-ON-THE-MAIN, GERMANY, ASSIGNORS TO GENERAL ANILINE WORKS, INC., OF NEW YORK, N. Y., A CORPORATION OF DELAWARE

NUCLEAR SUBSTITUTION PRODUCT OF 1-AMINONAPHTHALENE-8-CARBOXYLIC ACID IN THE OPEN OR ANHYDRIDE FORM AND PROCESS OF MAKING SAME

No Drawing. Application filed November 29, 1926, Serial No. 151,596, and in Germany December 4, 1925.

The present invention relates to nuclear substitution products of 1-aminonaphthalene-8-carboxylic acid or its inner anhydride and to a process of preparing the same.

In application Serial No. 122,030, dated July 12, 1926 a new and original process for manufacturing the 1-aminonaphthalene-8-carboxylic acid and the inner anhydride thereof known in the literature under the name of naphthostyril is described, which consists in allowing to react at elevated temperatures an alkaline acting agent on the 8-cyannaphthalene-1-sulfonic acid.

We have now found that this process is not limited to the 8-cyannaphthalene-1-sulfonic acid, but also applicable to its nuclear substitution products, particularly to halogenated derivatives and those containing further sulfonic acid groups in the nucleus. These nuclear derivatives of the 8-cyannaphthalene-1-sulfonic acid are readily obtainable by diazotizing the corresponding nuclear substitution products of the 8-amino-naphthalene-1-sulfonic acid and treating the diazo bodies, thus produced, with cuprous cyanide, according to the Sandmeyer reaction.

In carrying out our process practically all methods may be applied, which are described in the above mentioned application, particularly caustic alkalies in aqueous or alcoholic solution or alkaline earths, preferably milk of lime may be used, either at ordinary pressure or in a closed vessel at elevated pressure when working in an autoclave the pressure corresponds functionally to the tension of the reacting agent and the temperature employed.

As is more fully stated in our application Serial No. 122.030, probably derivatives of the naphthostyril are primarily formed during the reaction which, however, are easily saponified by the action of dilute alkalis. Consequently according to the conditions under which the isolation is carried out, there are obtainable either derivatives of 1-aminonaphthalene-8-carboxylic acid having the probable formula:

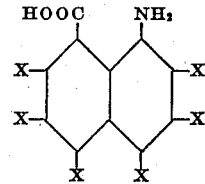

wherein X represents hydrogen, but at least one X represents a monovalent substituent, or derivatives of the naphthostyril having the probable formula:

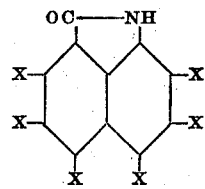

wherein X represents the same as above. They may be represented by the following general formula:

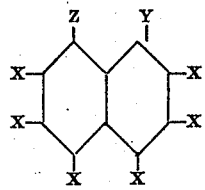

wherein Y represents an amino group and Z a carboxylic acid group or Y and Z jointly represent the group CO—NH and X represents the same as above.

When using as starting materials derivatives of 8-cyannaphthalene-1-sulfonic acid being substituted in the nucleus by at least one more sulfonic acid group the reaction can be varied in such a way that the last mentioned sulfonic acid group is replaced by a hydroxyl group. This can be effected, for instance, by using a higher temperature or a stronger alkaline acting agent. Thus when using 8-cyannaphthalene-1.6-di-sulfonic acid as starting material and caustic potash as alkaline acting agent, 6-sulfonic acid-1-aminonaphthalene-8-carboxylic acid is obtained when using a temperature of about 135° C., whereas 6-hydroxy-1-aminonaphthalene-8-carboxylic acid is obtained when using a temperature of for instance 170–200° C. It is obvious that in each case the suitable reaction conditions can easily be determined by experiments.

When alkylating the hydroxyl derivatives the corresponding alkoxy derivatives are obtained.

All these sulfo-, hydroxy- and alkoxy derivatives of the 1-aminonaphthalene-8-carboxylic acid are new compounds, not described hitherto in literature. They are of particular value as intermediates for the production of dyestuffs and pharmaceutical compounds.

In order to further illustrate our invention the following examples are given, the parts being by weight and all temperatures in centigrade degrees, but it is understood that our invention is not limited to the particular products or reaction conditions mentioned therein:

*Example 1*

40 parts of caustic potash and 50 parts of water are heated in a suitable vessel until the mass is dissolved. Then 10 parts of the sodium salt of the 8-cyan-4-chloronaphthalene-1-sulfonic acid (obtainable from the 8-amino-4-chloronaphthalene-1-sulfonic acid (see Ber. der Deutsch. Chem. Ges. vol. 55, page 51) in the cited manner) are added at about 150°. The vessel is closed and then heating is continued under reflux. The temperature is slowly increased while stirring well to about 180–200°.

When the reaction is finished, the product of reaction thus obtained consists almost entirely in the potassium salt of 4-chloronaphthostyril.

In order to isolate the free 4-chloronaphthostyril the melted mass is diluted with water after cooling down, acidified and the separated 4-chloronaphthostyril, having probably the formula:

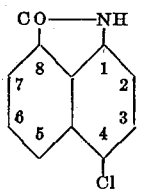

is filtered, washed with water and dried. It crystallizes from alcohol in form of yellow needles, melting at 270°. It can be easily converted into the corresponding 4-chloro-1-amino-naphthalene-8-carboxylic acid, f. i. by warming it with a dilute caustic soda solution. This acid is when dry a feebly colored powder, easily soluble in water. It is diazotizable and capable of combining with diazo compounds.

*Example 2*

4 parts of caustic potash and 5 parts of methylic alcohol are heated for some time at 80–100° while stirring; at this temperature 1 part of the sodium salt of the 8-cyannaphthalene-1.6-disulfonic acid, derived from 8-aminonaphthalene-1.6-disulfonic acid by Sandmeyer's reaction, is added. Then methylic alcohol is slowly distilled off, until the temperature of the mass rises to about 135°. At this temperature heating is continued for some hours under reflux. Then the mass is cooled down, diluted with water and gently acidified while cooling. With a strong evolution of sulfurous acid a new compound separates, which has probably the chemical constitution of the 6-sulfonic acid-1-aminonaphthalene-8-carboxylic acid of the formula:

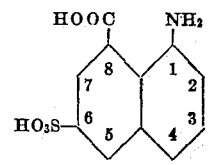

The new acid is diazotizable and capable of combining with diazo compounds.

By shortly heating it with acids or when strongly acidifying the mass of fusion after the dilution with water, without cooling it, a yellowish-colored crystallized compound separates, which is neither diazotizable nor capable of combining with diazo compounds. It is soluble in alkalies with a yellowish color and when heating this solution for some time the 6-sulfonic acid-1-aminonaphthalene-8-carboxylic acid is re-obtained. From these properties it is to be assumed that the substance has the constitution of the 6-sulfonic acid naphthostyril:

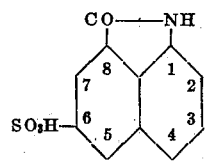

*Example 3*

1 part of the sodium or any suitable salt of the 8-cyannaphthalene-1.6-disulfonic acid is heated with 15 parts of milk of lime of 25° Bé. for some hours at 200–250° in an autoclave while stirring. After cooling down the mass is acidified and the separated 6-sulfonic acid-1-aminonaphthalene-8-carboxylic acid is filtered and purified by dissolving it in a solution of sodium carbonate, filtering this solution and precipitating it with acids.

The product thus obtained, is according to its properties identical with the acid, described in Example 2.

Example 4

1 part of the sodium salt of the 8-cyannaphthalene-1.6-disulfonic acid is heated with 4 parts of caustic potash and 5 parts of methylic alcohol for some hours at 170–200° in an autoclave while stirring. After cooling down the diluted mass is acidified and the precipitate is filtered and purified by redissolving it in a solution of sodium carbonate and precipitating this solution with acids.

The new compound according to its properties appears to be the 6-hydroxy-1-aminonaphthalene-8-carboxylic acid of the formula:

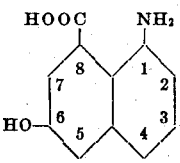

It is when dry a colorless powder, which is diazotizable and also capable of combining with diazo compounds. By heating it for a short time with a dilute mineral acid, it is converted in a new compound, being probably the 6-hydroxynaphthostyril. It is when dry a yellow crystalline powder. It crystallizes from dilute alcohol in long needles, melting above 210° with decomposition. It is no longer diazotizable, but still capable of combining with diazo compounds.

By boiling it with alkalies the free 6-hydroxy-1-aminonaphthalene-8-carboxylic acid is easily re-obtained.

By treating it with suitable alkylating agents it is alkylated in the hydroxy group and the thus formed 6-alkoxy-naphthostyrils can be saponified to the corresponding 6-alkoxy-1-aminonaphthalene-8-carboxylic acids.

If in the foregoing examples instead of the 8-cyannaphthalene-1.6-disulfonic acid the 8-cyannaphthalene-1.3-disulfonic acid is used (obtainable from 8-aminonaphthalene-1.3-disulfonic acid by Sandmeyer's reaction), the corresponding 3-sulfo-, 3-hydroxy- and 3-alkoxy derivatives of the 1-aminonaphthalene-8-carboxylic acid are obtained.

Example 5

4 parts of caustic potash and 5 parts of methylic alcohol are heated for some time at 80–100°; at this temperature one part of the sodium salt of the 8-cyannaphthalene-1.5-disulfonic acid (obtainable from 8-aminonaphthalene-1.5-disulfonic acid by Sandmeyer's reaction) is added. At this temperature heating is continued for some hours under reflux. After cooling down the mass of fusion is diluted with salt water and acidified while cooling. With an evolution of sulfurous acid the potassium salt of a new compound separates, which according to its properties has probably the chemical constitution of an hydroxynaphthamide-sulfonic acid of the formula:

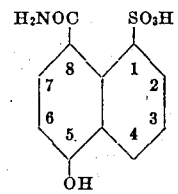

When recrystallized from water it forms long needles. It is capable of combining with diazo compounds.

Example 6

(a) 40 parts of caustic potash and 50 parts of water are heated in a suitable vessel until the mass is dissolved. Then 10 parts of the sodium salt of the 8-cyannaphthalene-1.5-disulfonic acid are added at about 150°. The vessel is closed and then heating is continued under reflux. The temperature is slowly increased while stirring to about 200° and the mass of fusion is kept for some hours at this temperature.

After cooling down the mass is diluted with water and acidified and the precipitate is filtered and washed with water; the 5-hydroxynaphthostyril, thus obtained, corresponding probably to the formula:

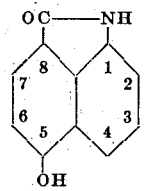

forms, when recrystallized from acetic acid, almost colorless needles, melting above 300°. It is not diazotizable, but capable of combining with diazo compounds.

It may be isolated and purified also by means of the difficultly soluble sodium salt.

When carrying out the process in a closed vessel, the same compound is obtained.

The same 5-hydroxynaphthostyril is obtained, if in the process described in Example 5 such an amount of methylic alcohol is distilled off, that the temperature of the mass of fusion rises to 180–190° and otherwise is worked as described above. The 5-hydroxynaphthostyril also results, if the intermediate product of Example 5 is subjected to the action of an aqueous caustic alkali at elevated temperatures.

It can be alkylated in the hydroxy group, f. i. by treating it as follows:

(b) 1 part of the sodium salt of 5-hydroxynaphthostyril is mixed with 4 parts of the methylic ester of paratoluene sulfonic acid, 4 parts of sodium carbonate and about 80 parts of trichlorobenzene and the mixture is heated to about 160–170°, until a sample no longer combines with a diazo compound. Then the trichlorobenzene is driven off by steam and the residue is filtered, washed and dried. The 5-methoxynaphthostyril thus obtained having probably the formula:

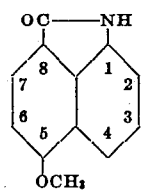

melts, when crystallized from benzene, at 223°. By boiling it with a caustic soda solution of about 10% it is saponified to the corresponding 5-methoxy-1-aminonaphthalene-8-carboxylic acid of the probable formula:

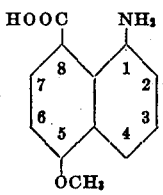

The free acid, obtainable by gently acidifying and cooling the above solution, is when dry a colorless powder, easily soluble in alkalies, it is diazotizable and capable of combining with diazo compounds. Its difficultly soluble diazo compound crystallizes in yellow crystals and yields azo dyestuffs, when combined with hydroxy- or amino compounds.

By warming the 5-methoxy-1-aminonaphthalene-8-carboxylic acid with acids the 5-methoxynaphthostyril is re-obtained.

In a similar way by ethylating the 5-hydroxynaphthostyril in the usual manner f. i. with ethyl bromide the corresponding 5-ethoxynaphthostyril is obtained, melting at about 200° and showing the same characteristic properties as the methyl-derivative.

We claim:

1. The process which comprises reacting at a temperature of about 80–250° C. with an alkaline acting agent upon a nuclear substitution product of 8-cyannaphthalene-1-sulfonic acid.

2. The process which comprises reacting at a temperature of about 80–250° C with an alkaline acting agent upon an 8-cyannaphthalene-1-sulfonic acid compound being substituted in the nucleus by at least one more sulfonic acid group.

3. The process which comprises reacting at a temperature of about 80–250° C. with a caustic alkali upon an 8-cyannaphthalene-1-sulfonic acid compound being substituted in the nucleus by at least one more sulfonic acid group.

4. The process which comprises reacting at a temperature of about 80–250° C. with a caustic alkali upon an 8-cyannaphthalene-1-sulfonic acid compound being substituted in the nucleus by at least one more sulfonic acid group and isolating the reaction product in the form of its inner anhydride.

5. The process which comprises reacting at a temperature of about 150–200° C. with a caustic alkali in an aqueous medium upon the sodium salt of 8-cyannaphthalene-1.5-di-sulfonic acid.

6. The process which comprises reacting at a temperature of about 150–200° C. with a caustic alkali in an aqueous medium upon the sodium salt of 8-cyannaphthalene-1.5-di-sulfonic acid and isolating the reaction product in the form of its inner anhydride.

7. As new products, the compounds of the general formula:

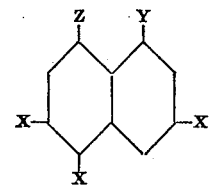

wherein Y represents an amino group and Z a carboxylic acid group or Y and Z jointly represent the group CO—NH and X represents hydrogen but one X stands for a sulfonic acid-, a hydroxyl- or an alkoxyl group.

8. As new products, the compounds of the general formula:

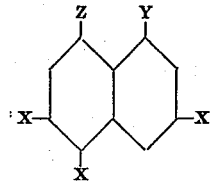

wherein Y represents an amino group and Z a carboxylic acid group or Y and Z jointly represent the group CO—NH and X represents hydrogen but one X stands for a hydroxyl- or an alkoxyl group.

9. As new products, the compounds of the general formula:

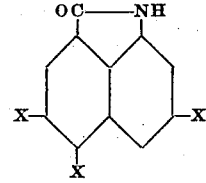

wherein X represents hydrogen but one X stands for a sulfonic acid-, hydroxyl- or alkoxyl group.

10. As new products, the compounds of the general formula:

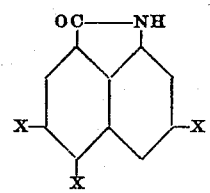

wherein X represents hydrogen but one X stands for a hydroxyl- or an alkoxyl group.

11. As new products, the compounds of the general formula:

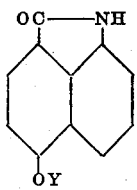

wherein Y represents hydrogen or an alkyl group.

12. As a new product, the compound of the probable formula:

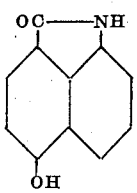

being when dry an almost colorless crystalline powder, soluble in diluted caustic alkali solutions and being converted into 5-hydroxy-1-amino naphthalene-8-carboxylic acid when being treated with an alkaline saponifying agent.

In testimony whereof, we affix our signatures.

RICHARD HERZ.
FRITZ SCHULTE.